Aug. 16, 1966   B. T. PLIZAK ETAL   3,266,227
WATER AND MIST ENTRAINMENT SEPARATOR
Filed May 29, 1963
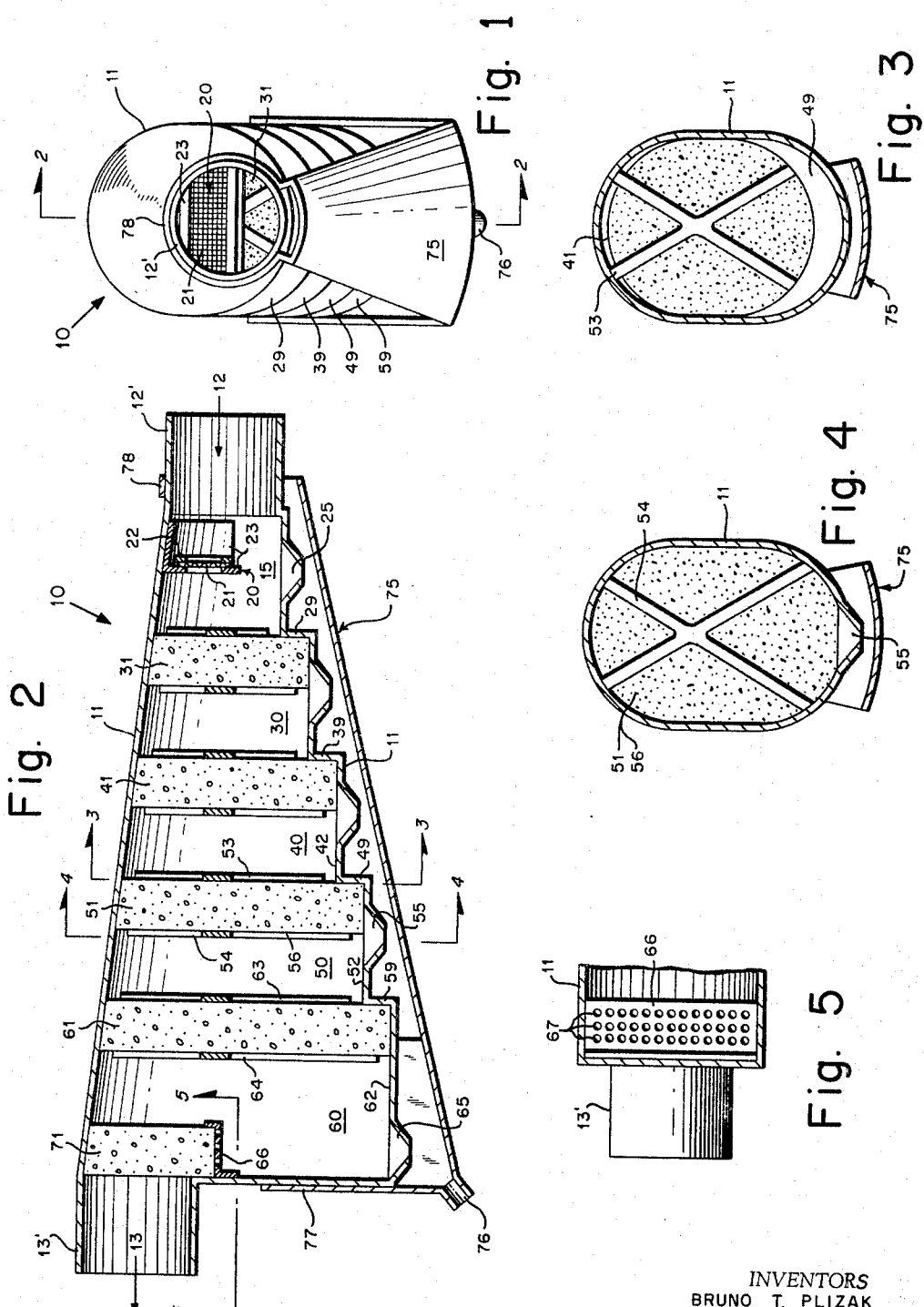
INVENTORS
BRUNO T. PLIZAK
ALBERT C. CHECK, SR.
BY
ATTORNEY United States Patent Office 3,266,227
Patented August 16, 1966

3,266,227
WATER AND MIST ENTRAINMENT SEPARATOR
Bruno T. Plizak, Philadelphia, and Albert C. Check, Sr., Ambler, Pa., assignors to the United States of America as represented by the Secretary of the Navy
Filed May 29, 1963, Ser. No. 284,264
1 Claim. (Cl. 55—426)

The invention described herein may be manufactured and used by or for the Government of the United States of America for governmental purposes without the payment of any royalties thereon or therefor.

This invention relates to a water and mist entrainment separator and more particularly to a separator for eliminating and removing other contaminants contained in air in the free state.

With the advent of modern high performance aircraft and the high density of electronic systems and packages contained therein, new problems have been introduced not heretofore apparent with the slower speed aircraft which did not contain these electronic systems. These electronic packages have increased cooling requirements heretofore met by ambient cabin air and a greater supply of cooling air is required for this purpose. Where these aircraft utilize air cycle refrigeration, and atmospheric air is the major source of cooling air, there is a greater necessity for the separation and elimination of entrained moisture or water from the air so obtained from the atmosphere for purposes of cooling the aircraft electronic systems. This entrained moisture or water if not removed could cause serious problems, such as a short circuiting of the microminiaturized electronic equipment. At present, the aircraft water separators being used are complex devices which utilize rotational or centrifugal action to eliminate entrained water from air. These have proven below efficiency standards of operation and often require a high operating static pressure head.

It is an object of the present invention to provide a device for separating and removing free entrained moisture and mist from an aircraft cooling system.

Another object of this invention is to provide a static, mechanical device which requires no moving parts and which introduces a minimum of back pressure through the air system.

A further object of this invention is to provide a device which will operate efficiently in a horizontal, elevated, or depressed altitude.

Still another object of the invention is to provide a water separating device which is highly efficient, inexpensive to manufacture with relatively little maintenance and installation costs, and easily adaptable to various locations of utilization.

Various other objects and advantages will appear from the following description of an embodiment of the invention and the novel features will be particularly pointed out hereinafter in connection with the appended claims.

In the drawings:

FIG. 1 is an end view in elevation of the water separator of the present invention taken at the inlet end of the separator and looking inwardly thereof.

FIG. 2 is a cross-sectional view taken along the lines 2—2 of FIG. 1.

FIG. 3 is a cross-sectional view taken along the lines 3—3 of FIG. 2.

FIG. 4 is a cross-sectional view taken along the lines 4—4 of FIG. 2.

FIG. 5 is a cross-sectional view taken along the lines 5—5 of FIG. 2.

In the illustrated embodiment of the invention and first referring to FIGS. 1 and 2, the water separator generally noted at 10 is constructed for insertion in the ducting of an aircraft referigeration system which provides the cooling air for the aircraft electronic systems. The separator 10 has the purpose of insuring that the cooling air is clean and free of entrained contaminants, such as water, and includes a conical housing indicated at 11 of stepped configuration being progressively larger in cross section from the inlet end 12 to the outlet end 13. The housing 11 has an inlet duct 12′ and an outlet duct 13′ both constructed and configured for attachment to external cooling-air lines not shown.

Referring to FIGS. 1, 2, 3 and 4, the housing 11, by reason of the stepped configuration thereof, comprises a plurality of elliptical sections generally indicated at 15, 30, 40, 50 and 60, sections 30, 40, 50 and 60 including a porous member of cross-sectional area equal to the cross-sectional area of the respective elliptical section, the porous members being indicated at 31, 41, 51 and 61, and being further described below.

Within the elliptical section 15 of housing 11 and adjacent the inlet end 12 thereof is located a screen assembly generally indicated at 20. Assembly 20 occupies substantially the upper half of section 15 of the separator and includes a screen 21 of appropriate open mesh size held in its operative relationship by the engagement of plate 22 with screen retainer 23, the latter being configured to the interior portion of the conical housing 11 and is rigidly secured thereto by any appropriate fastening means as by epoxy adhesive or welding. Both the plate 22 and the retainer 23 frame the screen 21 thereby allowing some incoming air to pass through it, the screen functioning as an initial impingement coalescer or stripper of water droplets from the entrained moisture ladened air, and further acting as a partial baffle to direct most of the water ladened air in a downward direction.

In order to provide rapid and effective elimination of water from the separator 10, a drainage port 25 is strategically located vertically below the screen 21, the port 25 being funnel-shaped and having its largest diameter approximately one-half the longitudinal distance of the elliptical section 15. The location of the drain obtains efficient operation of the water separator, the water requiring immediate drainage in order to minimize the carry over of water to the adjacent elliptical section of the separator and to prevent the coalesced water from sloshing around within the separator 10.

The bottom portion of the section 15 remote from the inlet end 12 terminates in a baffle wall 29 and thereby forms the second elliptical section of greater cross-sectional area and indicated at 30.

In view of the similarity between elliptical sections 30, 40 and 50, the latter section 50 will be described with particular reference to FIGS. 2, 3 and 4. As illustrated in FIG. 2, section 40 has its lower or bottom wall 42 terminating in baffle wall 49 which forms the adjacent section 50. Porous member 51 formed of open pore foam material, such as polyurethane or the like, is seated upon the bottom wall 52 of section 50 and abuts the baffle wall 49 of the adjacent section 40. This porous member 51 is constructed and configured to conform to the interior design of section 50, fills a portion of the internal cross-sectional area of section 50 and is retained in its operative position and against movement by a pair of cross braces indicated at 53 and 54, respectively. These cross braces are appropriately secured to the interior surface of the housing 11 by epoxy cement or the like. In order to provide rapid drainage and maximum efficiency, the foam member 51 is located over one half of the funnel-shaped drainage port 55 formed in the housing 11 and has the edge 56 above and substantially in the center of the port 55.

The porous foam members 31, 41, 51, 61 and 71 act as the major water coalescer or agglomerator in that fine particles of entrained moisture, even in the form of mist, are coalesced into larger water particles upon impinging upon the internal surfaces of the foam. A characteristic property of the open pore polyurethane foam material is that it does not hold or retain the coalesced water droplets in a manner of a sponge but rather permits them to drop or flow downward through the foam thus permitting the water to be removed from the foam sections by suitably located drains such as 55.

Referring now to FIG. 2, the elliptical section 60 is of greater longitudinal dimension than the prior sections and includes a porous element 61 supported on the bottom wall 62, abutting baffle wall 59, and retained by cross braces 63 and 64. A funnel-shaped drainage port 65 is located adjacent the end of the section 60.

Vertically disposed above the port 65 and adjacent the outlet duct 13' is a Z-shaped baffle member 66 having a plurality of apertures 67 formed in the horizontal surface thereof. Member 66 supports an additional porous member 71 which in turn covers the outlet opening 13 and has the function thereof of coalescing or agglomerating entrained moisture in a manner similar to the porous members 31, 41, 51 and 61. The porous member 71 additionally prevents water from running into the outlet 13' at high water separation rates when the aircraft operates in a downward position or negative attitude.

At the lower portion of the housing 11 a drainage unit 75 is provided to receive the drainage from the outlet drains such as 25, 55 and 65 and to discharge the same through the drainage port 76 thereof. The drainage unit 75 is secured to the housing 11 by means of the flange 77 and collar 78 which extends about the inlet duct 12', these members being secured to the housing by any appropriate means and being designed to sufficiently evacuate the accumulated water discharged from the various ports, such as 25, 55 and 65.

As can readily be seen by the above description, the water separator is so constructed that satisfactory water separation and elimination is accomplished notwithstanding a sudden change in aircraft attitude during various aircraft maneuvers, such as a steep dive, or a steep climb. In a downward or negative attitude the bulk of the entrained water separated from the air will be eliminated or drained from the drainage port 65 located in the section 60. The large frontal volume of section 60 will permit the accumulation or buildup of water for a time period in excess of the time required for the aircraft to level out in horizontal flight at which point all the drains resume normal operation.

In an upward or positive attitude the entrained water separated from the air will be eliminated by each drain. However, any water which might tend to fall back into the inlet side of the separator will be restricted by the baffle walls 29, 39, 49 and 59. When the aircraft has resumed horizontal flight the drains again resume normal operation.

Furthermore, it is seen that the separator of the present invention will permit the entrained water which has coalesced to take an increasingly downward path toward the drains and away from water free air. This function is obtained by the nonconcentric location of the inlet duct 12' and outlet duct 13' with respect to each other, by the function of the screen 21, and by the resultant of forces of gravity and air line pressure acting on the coalesced water droplets. These forces direct the water droplets in a downward slanting path, decreasing in height through the foam sections and air spaces between the foam sections, toward the drains and thus permit water-free air to pass out of the separator.

Obviously many modifications and variations of the present invention are possible in the light of the above teachings. It is therefore to be understood that within the scope of the appended claims the invention may be practiced otherwise than as specifically described.

What is claimed is:

A device for separating and eliminating entrained liquid from a fluid medium comprising:
  an elongated longitudinally extending hollow body member having a bottom wall of stepped-conical configuration of increasing cross-sectional area along its length, said stepped configuration forming a plurality of baffles a portion of each depending below the preceding one,
  an inlet means at the smaller end of said member in a plane normal to the longitudinal axis of said member,
  an outlet means at the larger end of said member in a plane normal to said longitudinal axis and transversely offset above said inlet means, said fluid medium flowing from said inlet means to said outlet means,
  a plurality of coalescing means secured transversely in spaced relationship within said member and in a plane with each of said baffles for coalescing entrained liquid in said fluid medium, said coalescing means comprising open-pore foam material having a forward face directed toward the flow path and a rearward face directed away from the flow path, said baffles preventing the coalesced fluid from running back towards said inlet means during a change of attitude of said device,
  a plurality of discharge means aligned directly below and in a plane with said rearward faces of said foam material for enabling efficient drainage of said coalesced fluid while minimizing pressure loss in the device,
  screen means adjacent said inlet opening and extending from the top of said body member a distance sufficient to cover a portion of said inlet means for initially coalescing the entrained liquid and deflecting the liquid fluid medium in a downward direction,
  a discharge means directly below said screen means and in the bottom of said member providing efficient drainage for the coalesced fluid from said screen means,
  a coalescing means covering said outlet means for coalescing entrained liquid in said fluid medium and for preventing coalesced fluid from passing into said outlet means during a change of attitude of said device,
  a discharge means directly below said coalescing means covering said outlet means and in the bottom of said member for providing efficient drainage of the coalesced fluids, and
  drainage means secured to the lower portion of said member and extending along the longitudinal length of said member for accumulating and evacuating said coalesced fluid from said discharge means.

References Cited by the Examiner

UNITED STATES PATENTS

| | | | |
|---|---|---|---|
| 416,889 | 12/1889 | Barnard | 55—444 X |
| 1,572,245 | 2/1926 | Quinn | 55—446 |
| 2,112,335 | 3/1938 | Drennan | 55—315 X |
| 2,910,136 | 10/1959 | Valliant et al. | 55—320 X |
| 2,966,960 | 1/1961 | Rochlin | 55—502 |
| 2,992,814 | 7/1961 | Maher | 55—318 |
| 2,995,204 | 8/1961 | Prostshakov | 55—320 |
| 3,030,754 | 4/1962 | Root et al. | 55—320 |
| 3,190,057 | 6/1965 | Sinex | 55—313 |

FOREIGN PATENTS

| | | |
|---|---|---|
| 148,908 | 6/1921 | Great Britain. |

ROBERT F. BURNETT, *Primary Examiner.*

HARRY B. THORNTON, *Examiner.*

D. K. DENENBERG, *Assistant Examiner.*